United States Patent [19]

Maeba

[11] Patent Number: 5,040,851
[45] Date of Patent: Aug. 20, 1991

[54] PNEUMATIC CIRCUIT FOR WHEEL MOUNTED SHOVEL

[75] Inventor: Eiji Maeba, Hiroshima, Japan

[73] Assignee: Kabushiki Kaisha Kobe Seiko Sho, Kobe, Japan

[21] Appl. No.: 542,027

[22] Filed: Jun. 22, 1990

[30] Foreign Application Priority Data

Jun. 23, 1989 [JP] Japan .................... 1-73853[U]

[51] Int. Cl.⁵ .............................................. B60T 13/68
[52] U.S. Cl. ...................................................... 303/5
[58] Field of Search .............................. 303/2, 3, 5, 15

[56] References Cited

U.S. PATENT DOCUMENTS

| | | | |
|---|---|---|---|
| 2,918,332 | 12/1959 | Hines | 303/5 X |
| 2,942,917 | 6/1960 | Swander | 303/5 |
| 3,155,433 | 11/1964 | Brueder | 303/2 |
| 4,428,621 | 1/1984 | Také et al. | 303/2 X |

Primary Examiner—Robert J. Oberleitner
Assistant Examiner—Alfred Muratori
Attorney, Agent, or Firm—Oblon, Spivak, McClelland, Maier & Neustadt

[57] ABSTRACT

A pneumatic circuit for a wheel mounted shovel wherein an air passage which extends through a swivel joint of the wheel mounted shovel is communicated commonly with a parking brake device and a suspension locking device of the wheel mounted shovel. The pneumatic circuit comprises a solenoid operated control valve communicated with a pressure source by way of a first air passage. The control valve is communicated with a working/service brake device by way of a second air passage. A third air passage is also connected to the control valve and is branched at a location on the downstream side of a swivel joint of the wheel mounted shovel into fourth and fifth air passages connected to the parking brake device and suspension locking device, respectively. An electric circuit is connected to the pneumatic circuit and includes a manually operable change-over switch for controlling the control valve to selectively connecting the first air passage to either one or neither one of the second and third air passages.

5 Claims, 3 Drawing Sheets

PNEUMATIC CIRCUIT FOR WHEEL MOUNTED SHOVEL

BACKGROUND OF THE INVENTION

1. Field of the Invention

This invention relates to a pneumatic circuit for a wheel mounted shovel which includes a working/service brake device, a parking brake device and a suspension locking device which are controlled pneumatically.

2. Description of the Prior Art

Various pneumatic circuits for a wheel mounted shovel of the type mentioned are conventionally known. An exemplary one of such conventional pneumatic circuits is disclosed, for example, in Japanese Utility Model Publication No. 63-5978. The exemplary pneumatic circuit is shown in FIG. 3. Referring to FIG. 3, the pneumatic circuit shown includes a pair of working/service brake devices 1, a parking brake device 2 and a suspension locking device 3 which are all controlled pneumatically. When the wheel mounted shovel is to work, the working/service brake device 1, parking brake device 2 and suspension locking device 3 are all rendered operative to carry out individual braking and locking operations. But during travelling of the wheel mounted shovel, the devices 1, 2 and 3 described above do not carry out their braking or locking operation, and upon parking of the vehicle, the working/service brake device 1 does not carry out a braking operation while the parking brake device 2 and the suspension locking device 3 carry out a braking operation and a locking operation, respectively.

The pneumatic circuit shown in FIG. 3 further includes a foot pedal 4, a service brake valve 5, a working brake valve 6, a solenoid operated parking brake valve 7, a solenoid operated suspension control valve 8, a suspension locking valve 9, a pair of suspension locking cylinders 10, a booster 11 for the working/service brake device 1, a shuttle valve 12, a compression pump 13 serving as a pressure source, and an air tank 14. The pneumatic circuit is connected to an electric circuit for controlling the valves 6, 7 and 8. The electric circuit includes a main switch 15, a change-over switch 16, an on/off switch 17, and a power source 18.

As diagrammatically shown in FIG. 3, the service brake valve 5 and the working brake valve 6 are pneumatically connected to the working/service brake devices 1 by way of an air passage, and the parking brake valve 7 is pneumatically connected to the parking brake device 2 by way of another air passage while the suspension control valve 8 is connected to the suspension locking valve 9 by way of a further air passage. The three air passages described just above extend through a swivel joint (not shown) provided in a swing coupling section (not shown) of the wheel mounted shovel. Since the air passages individually have considerably great sectional areas, also the swivel joint has a great overall size. Further, since the parking brake valve 7 and the working brake valve 6 are provided separately from each other in order to allow the parking brake device 2 to function independently, a correspondingly high cost is required for the pneumatic circuit and a considerably great spacing is required for the valves 7 and 6. Besides, the on/off switch 17 for the suspension control valve 8 is normally held in an energized condition but is deenergized into an open condition only when the suspension locking device 3 is to be held in a locking condition during travelling of the wheel mounted shovel. Such normally energized condition is not preferable for the duration of the on/off switch 17.

SUMMARY OF THE INVENTION

It is an object of the present invention to provide a pneumatic circuit for a wheel mounted shovel wherein an air passage which extends through a swivel joint of the wheel mounted shovel is communicated commonly with a parking brake device and a suspension locking device of the wheel mounted shovel.

It is another object of the present invention to provide a pneumatic circuit for a wheel mounted shovel wherein a suspension locking device can be controlled during travelling of the wheel mounted shovel by suitably operating a switch.

In order to attain the objects, according to the present invention, there is provided a pneumatic circuit for a wheel mounted shovel which includes a working/service brake device, a parking brake device and a suspension locking device which are all controlled pneumatically, the pneumatic circuit comprising a pressure source, a solenoid operated control valve, a first air passage for the communication between the pressure source and the solenoid operated control valve, a second air passage for the communication between the solenoid operated control valve and the working/service brake device, a third air passage for the communication between the solenoid operated control valve and the parking brake device and suspension locking device, the third air passage being branched at a location on the downstream side of a swivel joint of the wheel mounted shovel into a fourth air passage connected to the parking brake device and a fifth air passage connected to the suspension locking device, and an electric circuit including a manually operable change-over switch for controlling the solenoid operated control valve to assume a selected one of first and second operative positions in which the first air passage is connected to the second air passage and the third air passage, respectively, and a neutral position in which the first air passage is connected neither one of the second and third air passages.

With the pneumatic circuit, since the solenoid operated control valve is interposed between the first air passage communicated with the pressure source and the second and third air passages communicated with the working/service brake device and the parking brake device and suspension locking device, respectively, only two air passages including the second and third air passages extend through the swivel joint of the wheel mounted shovel while three air passages extend through a swivel joint in such a conventional pneumatic circuit as described above. Accordingly, the swivel joint can be produced in a reduced overall size. Besides, the working/service brake device, parking brake device and suspension locking device can be selectively rendered operative suitably by manual operation of the change-over switch.

In addition, since the swivel joint can be made compact, a spacing within the wheel mounted shovel can be utilized more effectively. Also, the pneumatic circuit can be controlled readily by means of the change-over switch, and the facility in maintenance of the electric circuit including the switch is improved.

The pneumatic circuit may further comprise a suspension control valve interposed in the fifth air passage while the electric circuit further includes an on/off switch for controlling the suspension control valve to open or close the fifth air passage to the suspension locking device. When the on/off switch is operated into an on-state during travelling of the wheel mounted shovel, the suction control valve is changed over to bring the suspension locking device into a locking condition.

The change-over switch may have first and second operative positions and a neutral position corresponding to the first and second operative positions and the neutral position, respectively, of the solenoid operated control valve. Or alternatively, the change-over switch may have first and second operative positions corresponding to the first and second operative positions of the solenoid operated control valve while the electric circuit further includes an on/off switch connected in series to the change-over switch.

The pneumatic circuit may further comprise a sixth air passage connected in parallel to the solenoid operated control valve between the pressure source and the second air passage, and a service brake valve interposed in the sixth air passage and connected to be operated by a foot pedal of the wheel mounted shovel.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
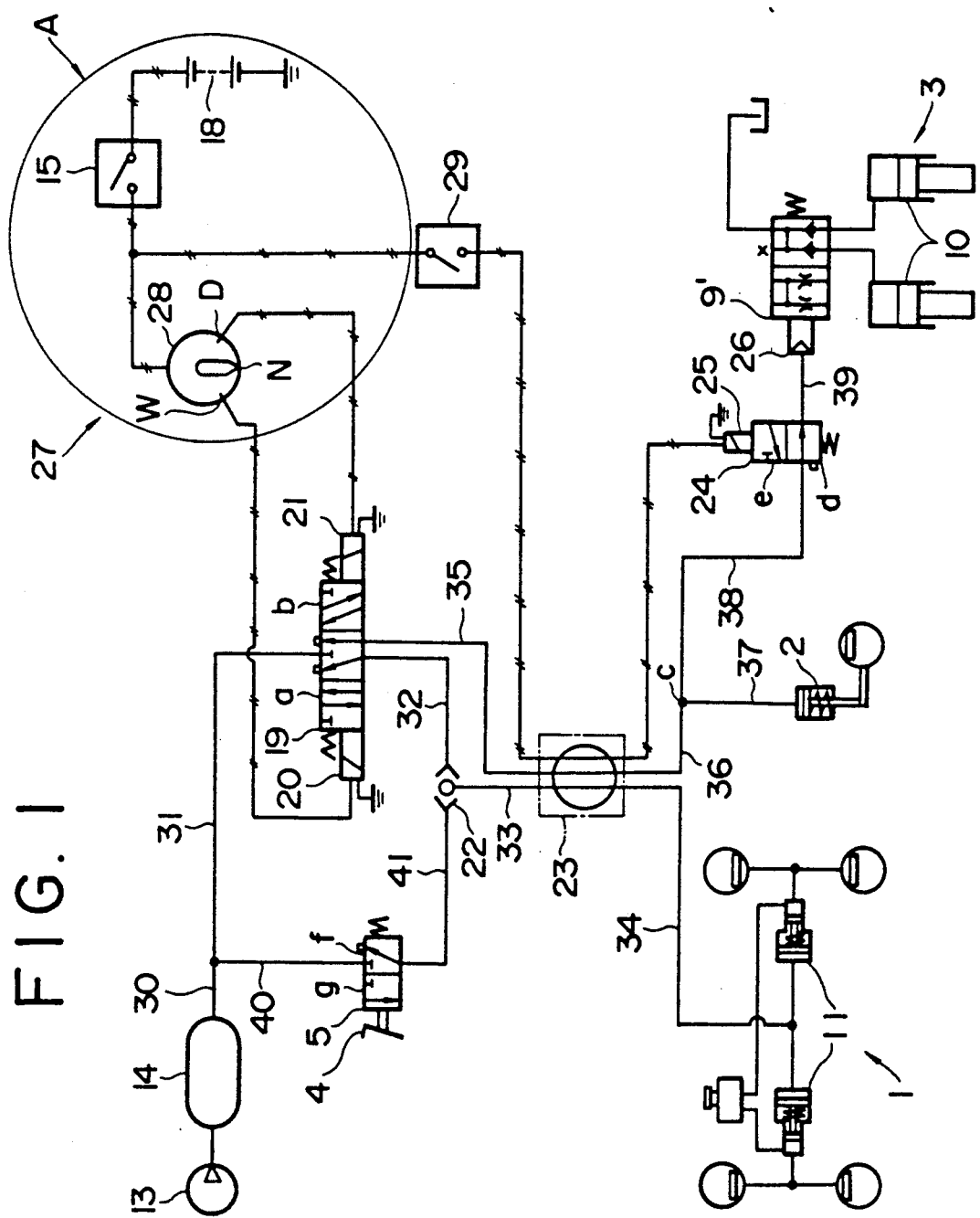
FIG. 1 is a circuit diagram of a pneumatic circuit for a wheel mounted shovel showing an embodiment of the present invention.
Figure 3:
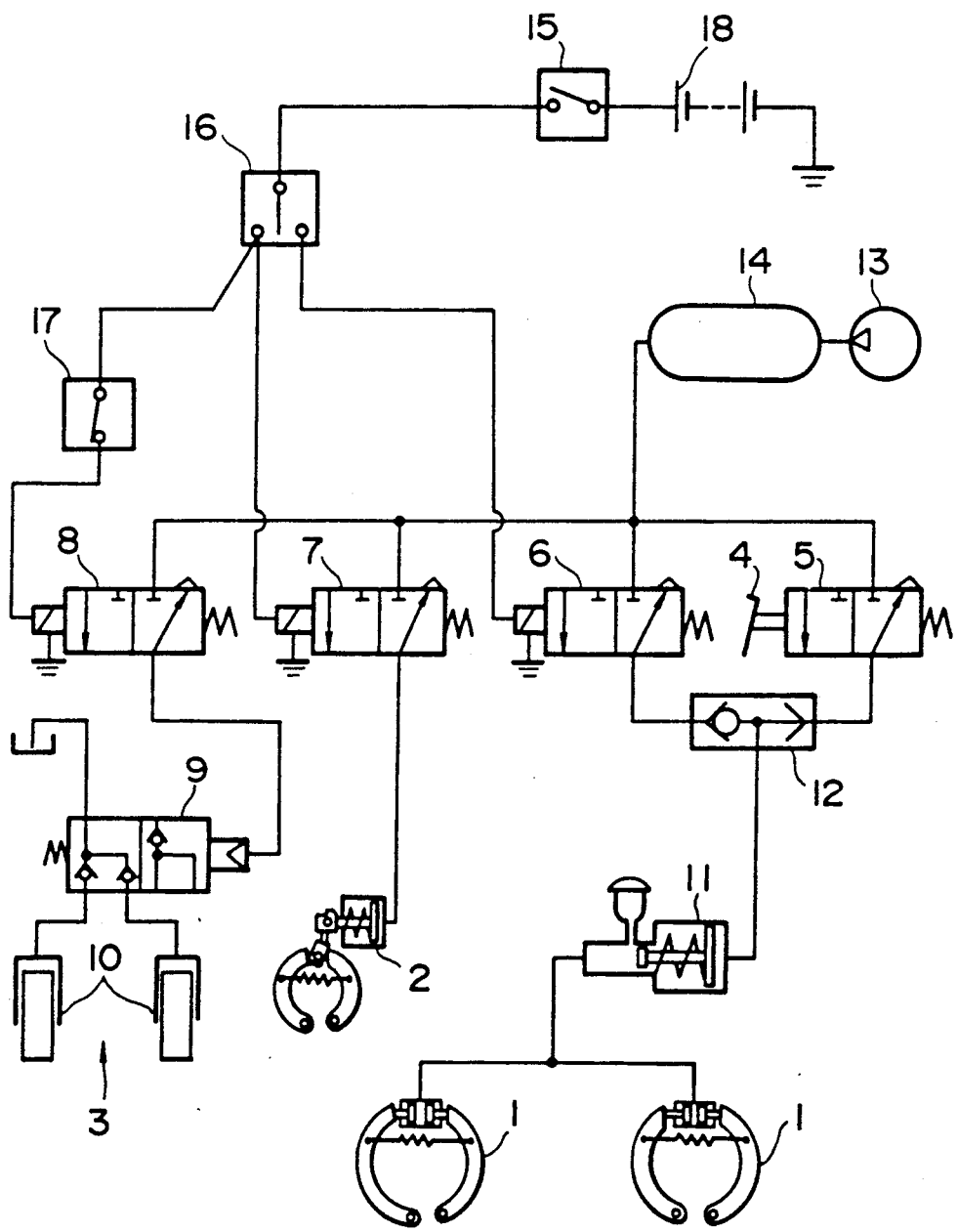
FIG. 3 is a circuit diagram of a conventional pneumatic circuit for a wheel mounted shovel.

Referring to FIG. 1, there is shown a pneumatic circuit for a wheel mounted shovel according to the present invention. It is to be noted that, in FIG. 1, like parts or elements are denoted by like reference characters to those of the conventional pneumatic circuit shown in FIG. 3, and overlapping description thereof is omitted herein to avoid redundancy. The pneumatic circuit shown in FIG. 1 includes a solenoid operated control valve 19 including a pair of left and right solenoids 20 and 21, a shuttle valve 22, a suspension control valve 24 including a solenoid 25, and a suspension locking valve 9' having a pressure receiving port 26. More particularly, the solenoid operated control valve 19 of the pneumatic circuit is interposed in an air passage which communicates an air tank 14 with a working/service brake device 1, a parking brake device 2 and a suspension locking device 3 and includes air passages 30 and 31. An air passage 35 extends from the control valve 19 and through a swivel joint 23 of the wheel mounted shovel, and an air passage 36 which is an extension of the air passage 35 on the downstream side of the swivel joint 23 is branched at a location c into two air passages 37 and 38. The air passage 37 is connected to the parking brake device 2 while the other air passage 38 is connected by way of another air passage 39 to the suspension locking device 3. The suspension control valve 24 is interposed between the air passages 38 and 39.

An electric circuit 27 is connected to the pneumatic circuit and includes a change-over switch 28 having a neutral position N, a working position W and a travelling position D. The electric circuit 27 further includes an on/off switch 29 for the operation of the suspension control valve 24. The change-over switch 28 is interposed between the solenoid operated control valve 19 and a power source 18 such that the solenoid operated control valve 19 may be controlled by the change-over switch 28. A main switch 15 is interposed between the power source 18 and the change-over switch 28, and the on/off switch 29 is connected between the main switch 15 and the solenoid 25 of the suspension control valve 24.

When a working operation is to be carried out with the wheel mounted shovel in which the hydraulic circuit described above is incorporated, the main switch 15 will be manually operated into an on-state and then the change-over switch 28 will be manually changed over to the working position W. Consequently, the solenoid 20 is energized so that the control valve 19 is changed over from its neutral position to its working position denoted at a in FIG. 1. Consequently, air from the air tank 14 is introduced into a pair of boosters 11 by way of the passages 30 and 31, the control valve 19 at the working position a, a further passage 32, the shuttle valve 22, a still further passage 33 extending through the swivel joint 23 and a yet further passage 34 which is an extension of the passage 33 on the downstream side of the swivel joint 23. Consequently, the working/service brake device 1 carries out a braking operation. Meanwhile, the air passage 35 for the communication with the parking brake device 2 and suspension locking device 3 is opened by the control valve 19 at the working position a. Consequently, the parking brake 2 and the suspension locking device 3 are both operated to carry out braking and locking operations, respectively.

In the meantime, when the wheel mounted shovel is to travel, the change-over switch 28 will be manually changed over to the travelling position D. Consequently, the solenoid 21 is energized to change over the control valve 19 to its travelling position b. As a result, air from the air tank 14 is introduced into the parking brake device 2 by way of the passages 30 and 31, the control valve 19 at the travelling position b and the passages 35, 36 and 37. In this instance, the air is branched at the location c of the passage 36 and introduced to the pressure receiving port 26 of the suspension locking valve 9' by way of the passage 38, the suspension control valve 24 at its position d and the passage 39. Consequently, the parking brake device 2 and the suspension locking device 3 are both brought out of their individual braking and locking conditions. Simultaneously, the air passage 32 for the communication with the working/service brake device 1 is opened by the control valve 19 at the travelling position b. Consequently, the working/service brake device 1 is brought out of its braking condition.

If a foot pedal 4 is operated while the wheel mounted shovel is travelling as described above, a service brake valve 5 is changed over from a position f to another position g. Consequently, air from the air tank 14 is introduced into the booster 11 by way of the passage 30, another passage 40, the service brake valve 5 at the position g, a further passage 41, the shuttle valve 22 and the passages 33 and 34. As a result, the working/service brake device 1 carries out a braking operation.

When the wheel mounted shovel is to be temporarily parked, the change-over switch 28 will be returned to its neutral position N. Consequently, both of the solenoids 20 and 21 of the control valve 19 are deenergized so that the control valve 19 is returned to its neutral position N. As a result, the air passages 32 and 35 for the communication with the working/service brake device 1 and the parking brake device 2 and suspension locking device 3, respectively, are all opened by the control valve 19 at the neutral position N. Consequently, the parking brake device 2 is operated into a braking condition, and the working/service brake device 1 is brought out of the braking condition while the suspension locking device 3 carries out a locking operation.

Finally, when the wheel mounted shovel is to be parked for a long period of time, the main switch 15 will be manually operated into an off-state whichever position the change-over switch 28 assumes. Consequently, both of the solenoids 20 and 21 of the control valve 19 are deenergized. Consequently, the parking brake device 2 is operated into a braking condition, but the working/service brake device 1 is brought out of a braking condition while the suspension locking device 3 is brought into a locking operation.

The suspension control valve 24 normally assumes the position d. However, if the switch 29 is manually operated into an on-state while the main switch 15 is held in an on-state and the wheel mounted shovel is travelling, then the solenoid 25 is energized so that the suspension control valve 24 is changed over from the position d to another position e. Consequently, the pressure receiving port 26 is opened by the suspension control valve 24 at the position e by way of the passage 39, and as a result, the suspension locking valve 9' is put into a locking condition.

Figure 2:
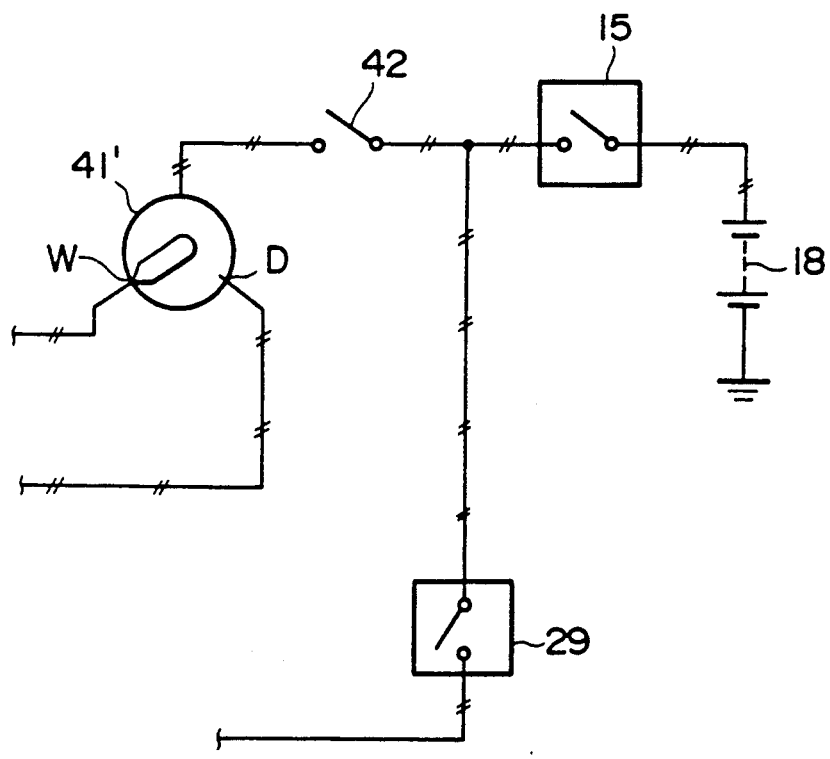
FIG. 2 is a circuit diagram showing a modification to an electric circuit of the pneumatic circuit substantially shown in a circle A in FIG. 1.

Referring now to FIG. 2, there is shown an electric circuit which is a modification to the electric circuit shown in FIG. 1. The modified electric circuit includes a change-over switch 41' and a temporary parking switch 42 in place of the change-over switch 41 of the electric circuit shown in FIG. 1. The change-over switch 41' is different from the change-over switch 41 only in that it does not have a neutral position. Instead, the temporary parking switch 42 is provided. The switch 42 may be provided at a location at which a driver can operate it readily in order to temporarily park the wheel mounted shovel. Thus, when it is intended to temporarily park the wheel mounted shovel, the switch 42 will be manually operated into an off-state.

Having now fully described the invention, it will be apparent to one of ordinary skill in the art that many changes and modifications can be made thereto without departing from the spirit and scope of the invention as set forth herein.

What is claimed is:

1. A pneumatic circuit for a wheel mounted shovel which includes a working/service brake device, a parking brake device and a suspension locking device which are all controlled pneumatically, said pneumatic circuit comprising:

a pressure source;
   a solenoid operated control valve;
   a first air passage for communicating said pressure source with said solenoid operated control valve;
   a second air passage for communicating said solenoid operated control valve with said working/service brake device;
   a third air passage for communicating said solenoid operated control valve with said parking brake device and said suspension locking device;
   a fourth air passage branching off from said third air passage at a location on a downstream side of a swivel joint of said wheel mounted shovel, said fourth air passage being connected to said parking brake device;
   a fifth air passage connected to said fourth air passage and to said suspension locking device;
   an electric circuit for controlling said solenoid operated control valve to assume a selected one of first and second operative positions and a neutral position; said first air passage being connected to said second air passage when said solenoid operated control valve is in said first operative position, said first air passage being connected to said third air passage when said solenoid operated control valve is in said second operative position, and said first air passage being disconnected from both said second air passage and said third air passage when said solenoid operated control valve is in said neutral position.

2. A pneumatic circuit according to claim 1, said pneumatic circuit further comprising a suspension control valve interposed in said fifth air passage, and said electric circuit further comprising a switch for controlling said suspension control valve to open or close said fifth air passage.

3. A pneumatic circuit according to claim 1, wherein said electric circuit includes a manually operable change-over switch having first and second operative positions corresponding to the first and second operative positions of said solenoid operated control value, respectively, and a neutral position corresponding to the neutral position of said solenoid operated control valve.

4. A pneumatic circuit according to claim 1, wherein said electric circuit includes a manually operable change-over switch having first and second operative positions corresponding to the first and second operative positions of said solenoid operated control valve, and said electric circuit further includes an on/off switch connected in series to said change-over switch.

5. A pneumatic circuit according to claim 1, further comprising a sixth air passage connected in parallel with said solenoid operated control valve between said pressure source and said second air passage, and a service brake valve interposed in said sixth air passage, said service brake valve connected to be operated by a foot pedal of said wheel mounted shovel.

* * * * *